US011368215B2

(12) United States Patent
Cavaliere et al.

(10) Patent No.: US 11,368,215 B2
(45) Date of Patent: Jun. 21, 2022

(54) METHOD OF ESTIMATING A PROPAGATION DELAY DIFFERENCE OF AN OPTICAL LINK AND APPARATUS FOR SAME

(71) Applicant: Telefonaktiebolaget LM Ericsson (publ), Stockholm (SE)

(72) Inventors: Fabio Cavaliere, Pisa (IT); Giulio Bottari, Pisa (IT); Stefano Ruffini, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/768,785

(22) PCT Filed: Dec. 13, 2017

(86) PCT No.: PCT/EP2017/082714
§ 371 (c)(1),
(2) Date: Jun. 1, 2020

(87) PCT Pub. No.: WO2019/114961
PCT Pub. Date: Jun. 20, 2019

(65) Prior Publication Data
US 2021/0175967 A1    Jun. 10, 2021

(51) Int. Cl.
*H04B 10/077* (2013.01)
*H04B 10/2513* (2013.01)

(52) U.S. Cl.
CPC ..... *H04B 10/0775* (2013.01); *H04B 10/2513* (2013.01)

(58) Field of Classification Search
CPC .............. H04B 10/0775; H04B 10/2513
(Continued)

(56) References Cited

U.S. PATENT DOCUMENTS

| 4,679,248 A * | 7/1987 | McKeown | H04B 17/345 455/226.1 |
| 6,026,214 A * | 2/2000 | Nagumo | G11B 27/36 386/274 |

(Continued)

FOREIGN PATENT DOCUMENTS

| EP | 0917392 A2 | 6/1998 |
| WO | 2013170910 A1 | 11/2013 |
| WO | 2015024599 A1 | 2/2015 |

OTHER PUBLICATIONS

International Search Report and Written Opinion dated Sep. 5, 2018 for International Application No. PCT/EP2017/082714 filed on Dec. 13, 2017, consisting of 9 pages.

(Continued)

*Primary Examiner* — Abbas H Alagheband
(74) *Attorney, Agent, or Firm* — Christopher & Weisberg, P.A.

(57) ABSTRACT

An optical link for a communication network, the optical link having an optical fibre link, a downstream transmitter, a downstream receiver, an upstream transmitter and an upstream receiver. The upstream and downstream transmitters are configured to transmit a respective pilot tone on a respective optical carrier and are configured to tune a frequency of the pilot tone within a preselected frequency range. The upstream and downstream receivers are configured respectively to determine an upstream notch frequency, $f_{notch\text{-}US}$, and a downstream notch frequency, $f_{notch\text{-}DS}$, of respective detected photocurrents from at least one respective pilot tone frequency at which the respective detected photocurrent is equal to or lower than a photocurrent threshold. The optical link also includes processing circuitry configured to receive the upstream and downstream notch frequencies and configured to estimate a propagation delay (Continued)

difference of the optical link depending on the upstream and downstream notch frequencies.

20 Claims, 10 Drawing Sheets

(58) Field of Classification Search
    USPC .......................................................... 398/25
    See application file for complete search history.

(56) References Cited

U.S. PATENT DOCUMENTS

| | | | | |
|---|---|---|---|---|
| 6,148,006 A * | 11/2000 | Dyke | ................... | H04M 11/062 |
| | | | | 370/480 |
| 6,263,048 B1 * | 7/2001 | Nelson | .................... | H04M 1/24 |
| | | | | 379/23 |
| 8,121,017 B2 * | 2/2012 | Stadelmeier | ........ | H04L 27/2666 |
| | | | | 370/203 |
| 8,451,879 B2 * | 5/2013 | Kennedy | .................. | H04B 3/54 |
| | | | | 375/257 |
| 8,750,717 B1 * | 6/2014 | Yap | ........................ | H03B 21/02 |
| | | | | 398/163 |
| 9,007,921 B2 * | 4/2015 | Pelekhaty | ............... | H04J 14/06 |
| | | | | 370/241 |
| 9,537,579 B2 * | 1/2017 | Olsson | .................... | H04B 10/64 |
| 9,584,217 B2 * | 2/2017 | Bottari | .................. | H04J 3/0661 |
| 9,813,175 B2 * | 11/2017 | Bottari | .................. | H04J 3/0667 |
| 10,809,805 B2 * | 10/2020 | Chen | ........................ | G06F 3/016 |
| 2001/0033611 A1 * | 10/2001 | Grimwood | .............. | H04J 13/16 |
| | | | | 375/219 |
| 2005/0041729 A1 * | 2/2005 | Noma | ....................... | H04B 3/23 |
| | | | | 375/222 |
| 2010/0272447 A1 * | 10/2010 | Kolze | .............. | H04B 10/25751 |
| | | | | 398/192 |
| 2016/0301496 A1 * | 10/2016 | Eiselt | ................. | H04B 10/0775 |
| 2018/0219621 A1 * | 8/2018 | Zinevich | ............ | H04B 10/2589 |

OTHER PUBLICATIONS

Petersen et al., "Online Chromatic Dispersion Monitoring and Compensation Using a Single Inband Subcarrier Tone", IEEE Photonics Technology Letters, vol. 14, No. 4, pp. 570-572, Apr. 2002, consisting of 3 pages.

* cited by examiner

METHOD OF ESTIMATING A PROPAGATION DELAY DIFFERENCE OF AN OPTICAL LINK AND APPARATUS FOR SAME

CROSS-REFERENCE TO RELATED APPLICATIONS

This application is a Submission Under 35 U.S.C. § 371 for U.S. National Stage Patent Application of International Application Number: PCT/EP2017/082714, filed Dec. 13, 2017 entitled "METHOD OF ESTIMATING A PROPAGATION DELAY DIFFERENCE OF AN OPTICAL LINK AND APPARATUS FOR SAME," the entirety of which is incorporated herein by reference.

TECHNICAL FIELD

The invention relates to an optical link for a communication network, a node for a communication network and a control system, and methods of estimating a propagation delay difference of an optical link of a communication network.

BACKGROUND

LTE TDD, Time Division Duplex, and LTE-Advanced impose very stringent time and phase synchronization requirements. This technical challenge is even more critical as small cells are added and networks evolve towards 5G new radio technologies and related applications, such as Critical Machine Type Communication.

An important technical challenge, introduced by the need for stringent time and phase synchronization, is the impact of asymmetry as the PTP Precision Time Procotol, PTP, packets travel back and forth across the network. Boundary Clocks and Transparent Clocks regenerate/adjust the timestamp to remove errors that would be created by the time spent in the network element, for packet processing, buffering, or queuing delays, for example. However, these clocks cannot compensate for differences in the upstream and downstream paths between a grandmaster clock and a client, due to network path asymmetry.

Network path asymmetry can require a network operator to manually measure and enter time offset to compensate, and then adjust the time offset when network paths change. It is therefore valuable to provide network operators with tools for automatic calibration of the path asymmetry in transport networks.

When time information is required, one solution is to use a packet based method, where the timing is carried across a packet network by sending packets containing timestamp information. The timestamps are generated by a master (server) that has access to an accurate reference, such as the Global Positioning System, GPS, and sent to a slave. When time synchronization is requested, a two-way timing protocol is mandatory, such as PTP, where the transfer delay from the master to a slave shall be calculated.

One fundamental assumption with this approach is that the delay from master to slave and from slave to master is identical. This means that any asymmetry in the network significantly impacts the performance of the delivered time synchronization reference. A major source of asymmetries in a transport network is related to forward and reverse traffic in the same fibre but transmitted over different wavelengths, such as in wavelength division multiplexed passive optical networks, WDM-PON, or in the case of forward and reverse traffic transmitted in two different fibres (using the same wavelength), therefore with different transmission characteristics and different lengths. Other application fields such as Common Public Radio Interface, CPRI, involve delay measurements that depend on the symmetry of the transmission channel.

The accuracy of phase/time synchronization required by mobile networks is typically in the order of microseconds or hundreds of nanoseconds. This implies that the handling of any source for asymmetry is controlled at the nanosecond level. To remove the asymmetries, it is possible to manually calibrate the links of the path. If the delay asymmetry of a path connected to an ingress port is known, corrections can be made as specified by the PTP protocol in case of IEEE1588, or in general by adjusting any measurement that is based on round trip measurements. This must be done, node by node, and can be an extremely costly and time-consuming process. Moreover, when any change occurs in the network, for example adding transmission equipment, the compensation has to be updated. This can be an overly complex and costly task, creating a significant obstacle in the deployment of IEEE1588 technologies relying on symmetric networks.

A solution to implement automatic compensation of path asymmetry is described in WO 2013/170910 A1. It describes a method to automatically compensate for asymmetry when the physical layer is based on dense WDM, DWDM, technology with coherent optical detection, using unidirectional transmission on two fibres or bidirectional transmission on one fibre. In the unidirectional case, two different optical channels are transmitted from a node A to a node B at two different wavelengths. The method determines a time difference between first and second optical test signals received on the two wavelengths and determines a value of a downstream dispersion parameter at node A and a value of an upstream dispersion parameter at node B, at each of the considered wavelengths. With this information, the length of the fibre links for the two directions may be estimated with a sufficient accuracy to automatically compensate asymmetry.

SUMMARY

It is an object to provide an improved optical link for a communication network. It is a further object to provide an improved node for a communication network. It is a further object to provide an improved control system. It is a further object to provide improved method of estimating a propagation delay difference of an optical link of a communication network.

An aspect of the invention provides an optical link for a communication network. The optical link comprises an optical fibre link, a downstream transmitter, a downstream receiver, an upstream transmitter, an upstream receiver, and processing circuitry. The upstream and downstream transmitters are configured to transmit a respective pilot tone on a respective optical carrier and are configured to tune a frequency of the pilot tone within a preselected frequency range. The upstream and downstream receivers are configured respectively to determine an upstream notch frequency, $f_{notch-US}$, and a downstream notch frequency, $f_{notch-DS}$, of respective detected photocurrents from at least one respective pilot tone frequency at which the respective detected photocurrent is equal to or lower than a photocurrent threshold. The processing circuitry is configured to receive the upstream and downstream notch frequencies and is configured to estimate a propagation delay difference of the optical link depending on the upstream and downstream notch frequencies.

The optical link enables propagation delay difference to be estimated, and thus compensated for, without requiring use of coherent optical systems, making the optical link simpler and cheaper to implement and enabling the optical link to be implemented in fronthaul networks, where coherent interfaces are seldom used. The optical link may be used in fronthaul systems such as those covered by the NG-PON2 and G.metro standards.

In an embodiment, the receivers are configured to determine the respective notch frequency from at least first and second pilot tone frequencies at which respective detected photocurrents equal the photocurrent threshold.

In an embodiment, the receivers are configured to calculate the respective notch frequency as an average of first and second pilot tone frequencies at which respective detected photocurrents equal the photocurrent threshold. One of said first and second pilot tone frequencies is above the respective notch frequency and the other is below the respective notch frequency.

In an embodiment, the receivers are configured to calculate the respective notch by linear interpolation of four pilot tone frequencies. Two pilot tone frequencies, $f_1$ and $f_4$, at which respective detected photocurrents equal the photocurrent threshold and two further pilot tone frequencies, $f_2$ and $f_3$, at which respective detected photocurrents equal a second, lower, photocurrent threshold. Two of the said four pilot tone frequencies, $f_3$ and $f_4$, are above the respective notch frequency and two of said four pilot tone frequencies, $f_1$ and $f_2$, are below the respective notch frequency. This may improve the accuracy of the calculated notch frequency over a simple average.

In an embodiment, the notch frequency is calculated as $$f_{notch} = \frac{f_4 f_1 - f_2 f_3}{f_1 - f_2 - f_3 + f_4}.$$

This may improve the accuracy of the calculated notch frequency over a simple average.

In an embodiment, the photocurrent threshold is set 50-60 dB lower than a photocurrent noise floor of the receiver. A reasonable accuracy in the estimation of the propagation delay difference can therefore be achieved by setting the photocurrent threshold slightly higher than the noise floor.

In an embodiment, the upstream and downstream transmitters are configured to tune a frequency of the pilot tone within the preselected frequency range, starting at an initial frequency which is not equal to a transfer function notch frequency of the optical fibre link.

In an embodiment, the receivers are configured to send an acknowledgement message to the respective transmitter to indicate receipt of the pilot tone at a currently set frequency and the transmitters are configured to vary the frequency of the pilot tone by a predetermined amount in response to receiving a said upstream acknowledgement message. The transmitters may therefore be instructed to stop transmission of the pilot tone once the notch frequency has been determined.

In an embodiment, the transmitters are configured to tune the frequency of the pilot tone in steps of a predetermined step size starting at an initial frequency and the receivers are configured to send a reporting message to the respective transmitter when an expected pilot tone is not received. The notch frequency may therefore be determined without requiring signalling between the receiver and the respective transmitter.

In an embodiment, the processing circuitry is configured to estimate the propagation delay difference depending inversely on a difference of the upstream and downstream notch frequencies.

In an embodiment, the respective optical carriers respectively have an upstream wavelength, $\lambda_{US}$, and a downstream wavelength, $\lambda_{DS}$. The processing circuitry is configured to estimate the propagation delay difference, $\Delta T$, as $$\Delta T = \frac{c}{4}\left(\frac{1}{\lambda_{DS} f_{notch-DS}^2} - \frac{1}{\lambda_{US} f_{notch-US}^2}\right).$$

In an embodiment, the optical fibre link comprises a first optical fibre for downstream transmission and a second optical fibre for upstream transmission. The processing circuitry is additionally configured to estimate respective lengths of the optical fibres depending on respective dispersion coefficients of the optical fibres at preselected respective wavelengths and respective notch frequencies of respective pilot tones transmitted on respective optical carriers at the respective wavelengths.

In an embodiment, the upstream and downstream transmitters are configured to transmit the respective pilot tones concurrently with respective traffic signals. Propagation delay asymmetry may therefore be estimated when traffic signals are being transmitted, i.e. in service operation is possible.

In an embodiment, the frequencies of the pilot tones are in a frequency range in which a spectrum of the respective traffic signal is negligible.

In an embodiment, the receivers are configured to extract the respective pilot tone from the respective traffic signal. The receivers may be configured with a narrowband phase locked loop to extract a sinusoidal pilot tone from traffic signal or the pilot tone may comprise a codeword that can be extracted from the traffic signal.

In an embodiment, the pilot tones are transmitted in an available field of the respective traffic signal's data frame, such as a reference frame or an optical transport network, OTN, frame.

In an embodiment, the pilot tones are transmitted as an overmodulated channel.

In an embodiment, the upstream and downstream transmitters comprise an oscillator configured to generate the respective pilot tone with a stability of a few parts per million, ppm. A stability of a few ppm is sufficient to estimate the propagation delay difference to an accuracy in the order of nanoseconds, ns, which meets currently envisaged fronthaul network applications in the NG-PON2 and G.metro standards. Low cost, free to run oscillators may therefore be used.

In an embodiment, the processing circuitry is remotely located, in one of a network control system and a network management system.

In an embodiment, the processing circuitry is located in a network node with a respective pair of the downstream transmitter, downstream receiver, upstream transmitter, and upstream receiver.

In an embodiment, the downstream and upstream receivers are direct detection receivers. Low cost optical interfaces, such as small form-factor pluggable, SFP, transceivers, may therefore be used in the optical link. Coherent optical receivers are not required, making the optical link simpler and cheaper to implement and enabling the optical link to be implemented in fronthaul networks, where coherent receivers are seldom used.

Corresponding embodiments apply to the method of estimating a propagation delay difference of an optical link, the node for a communication network and the control system described below.

An aspect of the invention provides a method of estimating a propagation delay difference of an optical link of a communication network. The method comprises steps of:

transmitting respective pilot tones on upstream and downstream optical carriers, the frequencies of the pilot tones being tuned within a preselected frequency range;

determining an upstream notch frequency, $f_{notch\text{-}US}$, and a downstream notch frequency, $f_{notch\text{-}DS}$, of respective detected photocurrents from at least one respective pilot tone frequency at which the respective detected photocurrent is equal to or lower than a photocurrent threshold; and estimating a propagation delay difference of the optical link depending on the upstream and downstream notch frequencies.

The method enables propagation delay difference to be estimated without requiring use of coherent optical systems. The method can therefore be used to estimate, and thus compensated for, propagation delay difference in fronthaul networks, where coherent interfaces are seldom used, such as those covered by the NG-PON2 and G.metro standards.

In an embodiment, the respective notch frequency is determined from at least first and second pilot tone frequencies at which the respective detected photocurrents equal the photocurrent threshold.

In an embodiment, the respective notch frequency is calculated as an average of first and second pilot tone frequencies at which respective detected photocurrents equal the photocurrent threshold. One of said first and second pilot tone frequencies is above the respective notch frequency and the other is below the respective notch frequency.

In an embodiment, the respective notch frequency is calculated by linear interpolation of four pilot tone frequencies. Two pilot tone frequencies, $f_1$ and $f_4$, at which respective detected photocurrents equal the photocurrent threshold and two further pilot tone frequencies, $f_2$ and $f_3$, at which respective detected photocurrents equal a second, different, photocurrent threshold. Two of the said four pilot tone frequencies, $f_3$ and $f_4$, are above the respective notch frequency and two of said four pilot tone frequencies, $f_1$ and $f_2$, are below the respective notch frequency. This may improve the accuracy of the calculated notch frequency over a simple average.

In an embodiment, the notch frequency is calculated as $$f_{notch} = \frac{f_4 f_1 - f_2 f_3}{f_1 - f_2 - f_3 + f_4}.$$

This may improve the accuracy of the calculated notch frequency over a simple average.

In an embodiment, the photocurrent threshold is set 50-60 dB lower than a photocurrent noise floor for the measurement. A reasonable accuracy in the estimation of the propagation delay difference can therefore be achieved by setting the photocurrent threshold slightly higher than the noise floor.

In an embodiment, the frequencies of the pilot tones are tuned within the preselected frequency range starting at an initial frequency which is not equal to a transfer function notch frequency of the optical fibre link.

In an embodiment, the method comprises sending an acknowledgement message to indicate receipt of the pilot tone at a currently set frequency and the frequency of the pilot tone is tuned by a predetermined amount in response to receiving a said acknowledgement message. Transmission of the pilot tone may therefore be stopped once the notch frequency has been determined.

In an embodiment, the frequencies of the pilot tones are tuned in steps of a predetermined step size starting at an initial frequency and the method comprises sending a reporting message when an expected pilot tone is not received. The notch frequency may therefore be determined without requiring signalling between a receiver and a respective transmitter.

In an embodiment, the estimate of the propagation delay difference depends inversely on a difference of the upstream and downstream notch frequencies.

In an embodiment, the upstream and downstream optical carriers respectively have an upstream wavelength, $\lambda_{US}$, and a downstream wavelength, $\lambda_{DS}$. The propagation delay difference, $\Delta T$, is estimated as $$\Delta T = \frac{c}{4}\left(\frac{1}{\lambda_{DS} f_{notch-DS}^2} - \frac{1}{\lambda_{US} f_{notch-US}^2}\right).$$

In an embodiment, the optical link comprises a first optical fibre for downstream transmission and a second optical fibre for upstream transmission. The method additionally comprises estimating respective lengths of the optical fibres depending on respective dispersion coefficients of the optical fibres at preselected respective wavelengths and respective notch frequencies of respective pilot tones transmitted on respective optical carriers at the respective wavelengths.

In an embodiment, the respective pilot tones are transmitted concurrently with respective traffic signals. Propagation delay asymmetry may therefore be estimated when traffic signals are being transmitted, i.e. in-service operation is possible.

In an embodiment, the frequencies of the pilot tones are in a frequency range in which a spectrum of the respective traffic signal is negligible.

In an embodiment, the respective pilot tone is extracted from the respective traffic signal. A narrowband phase locked loop may be applied to extract a sinusoidal pilot tone from traffic signal or the pilot tone may comprise a codeword that can be extracted from the traffic signal.

In an embodiment, the pilot tones are transmitted in an available field of the respective traffic signal's data frame, such as a reference frame or an optical transport network, OTN, frame.

In an embodiment, the pilot tones are transmitted as an overmodulated channel.

In an embodiment, the pilot tones are generated with a stability of a few parts per million, ppm. A stability of a few ppm is sufficient to estimate the propagation delay difference to an accuracy in the order of nanoseconds, ns, which meets currently envisaged fronthaul network applications in the NG-PON2 and G.metro standards. Low cost, free to run oscillators may therefore be used to generate the pilot tones.

Corresponding embodiments apply to the method at a node of a communication network described below.

An aspect of the invention provides a node for a communication network comprising a transmitter and a receiver. The transmitter is configured to transmit a downstream pilot tone on a downstream optical carrier and is configured to tune a frequency of the downstream pilot tone within a preselected frequency range. The receiver is configured to receive an upstream pilot tone on an upstream optical carrier from a second node, a frequency of the upstream pilot tone varying within a preselected frequency range. The receiver is configured to determine an upstream notch frequency from at least one upstream pilot tone frequency at which a respective detected photocurrent is equal to or lower than a photocurrent threshold. The node is configured to provide an indication of the upstream notch frequency to processing circuitry configured to estimate a propagation delay difference of an optical link comprising the node and the second node.

An aspect of the invention provides a method at a node for a communication network comprising steps of:

transmitting a downstream pilot tone on a downstream optical carrier, the frequency of the downstream pilot tone being tuned within a preselected frequency range;

receiving an upstream pilot tone on an upstream optical carrier from a second node, a frequency of the upstream pilot tone varying within a preselected frequency range;

determining an upstream notch frequency from at least one upstream pilot tone frequency at which a respective detected photocurrent is equal to or lower than a photocurrent threshold; and providing an indication of the upstream notch frequency to processing circuitry configured to estimate a propagation delay difference of an optical link comprising the node and the second node.

An aspect of the invention provides a control system comprising processing circuitry configured to receive an upstream notch frequency and a downstream notch frequency of an optical link, and configured to estimate a propagation delay difference of the optical link depending on the upstream and downstream notch frequencies.

An aspect of the invention provides a computer program, comprising instructions which, when executed on at least one processor, cause the at least one processor to carry out any of the steps of the above described methods.

An aspect of the invention provides a carrier containing a computer program, comprising instructions which, when executed on at least one processor, cause the at least one processor to carry out any of the steps of the above described methods. The carrier is one of an electronic signal, optical signal, radio signal, or computer readable storage medium.

Processing circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Embodiments of the invention will now be described, by way of example only, with reference to the accompanying drawings.

DETAILED DESCRIPTION

The same reference numbers will used for corresponding features in different embodiments.

Figure 1:
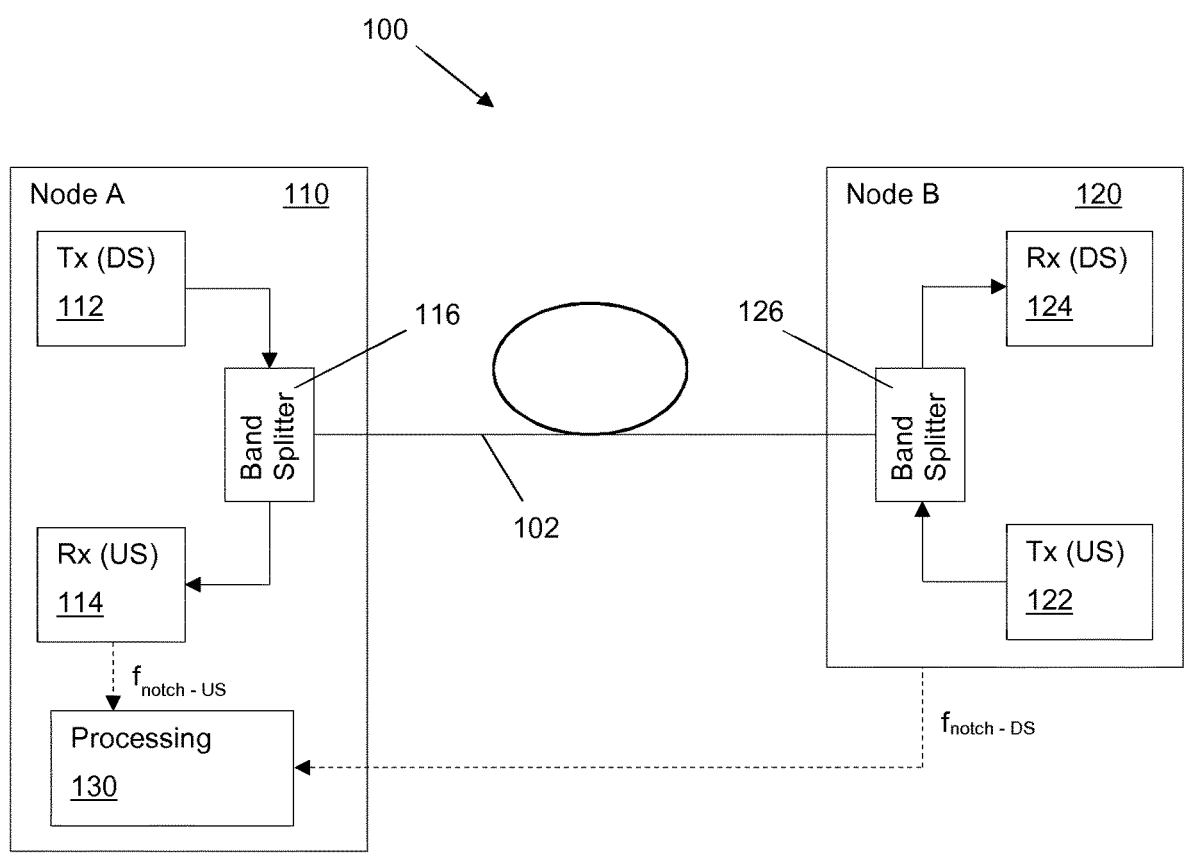
FIGS. 1, 2 and 5 illustrate optical links for a communication network according to embodiments of the invention.

Referring to FIG. 1, an embodiment of the invention provides an optical link 100 for a communication network, comprising an optical fibre link 102, a downstream transmitter 112, a downstream receiver 114, an upstream transmitter 122 and an upstream receiver 124 and processing circuitry 130.

The downstream transmitter 112, upstream receiver and processing circuitry 130 are provided at node A 110. The upstream transmitter 122 and downstream receiver 124 are provided at node B 120. A bandsplitter 116, 126 is provided at each node for routing upstream and downstream optical signals to and from the optical fibre link 102, which is configured for bidirectional propagation.

The downstream transmitter 112 is configured to transmit a downstream pilot tone on a downstream optical carrier and is configured to tune a frequency of the downstream pilot tone within a preselected frequency range. The upstream transmitter 122 is configured to transmit an upstream pilot tone on an upstream optical carrier and is configured to tune a frequency of the upstream pilot tone within the preselected frequency range.

The upstream receiver 114 is configured to determine an upstream notch frequency, $f_{notch-US}$, of detected photocurrents from at least one upstream pilot tone frequency at which the respective detected photocurrent is equal to or lower than a photocurrent threshold. The downstream receiver 124 is similarly configured to determine a downstream notch frequency, $f_{notch-DS}$, from at least one downstream pilot tone frequency at which the respective detected photocurrent is equal to or lower than the photocurrent threshold.

The processing circuitry 130 is configured to receive the upstream and downstream notch frequencies and is configured to estimate a propagation delay difference of the optical link depending on the upstream and downstream notch frequencies.

Figure 2:
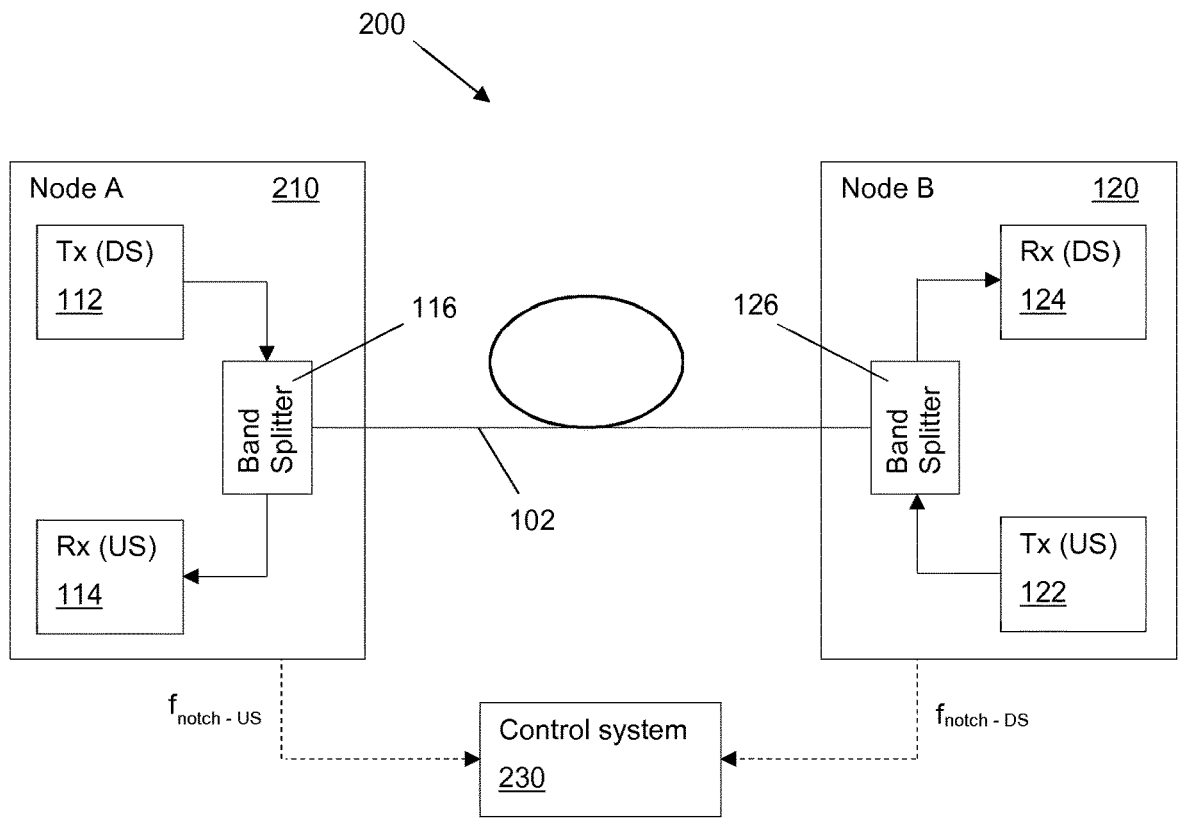

An optical link 200 according to another embodiment of the invention is illustrated in FIG. 2. In this embodiment, the processing circuitry is remotely located in a control system 230 such as a network control system or a network management system.

Figure 3:
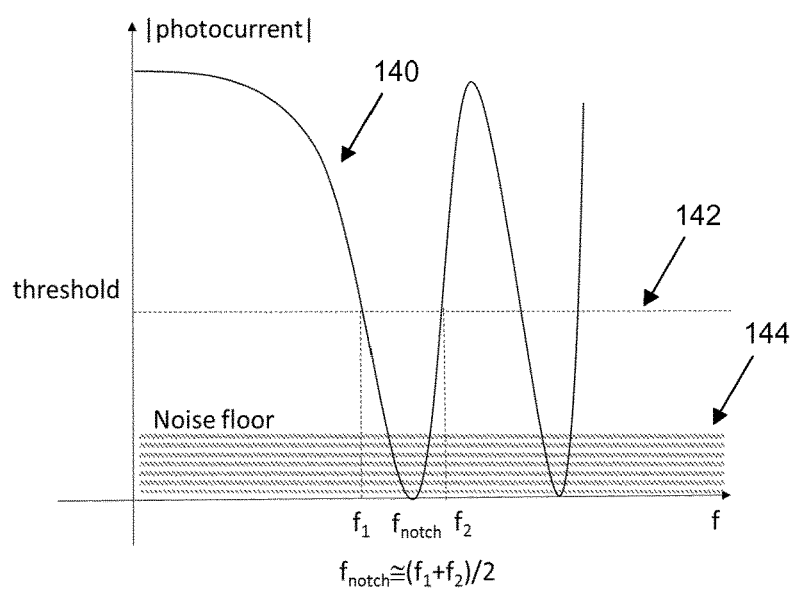
FIGS. 3 and 4 illustrate estimation of a notch frequency according to embodiments of the invention.

Referring to FIG. 3, the receivers 114, 124 are configured to calculate the respective notch frequency as an average of a first pilot tone frequency, $f_1$, and a second pilot tone frequency, $f_2$, at which respective detected photocurrents 140 equal the photocurrent threshold, 142. The first pilot tone frequency is below the notch frequency, $f_{notch}$, and the second pilot tone above the notch frequency.

When a pure tone, e.g. a sinusoidal signal, is sent into an optical fibre system, the detected photocurrent is proportional to:

$$\cos\left(\frac{\pi f_{sc}^2 \lambda^2 DL}{c}\right) \qquad \text{Equation 1}$$

where $f_{SC}$ is the tone frequency, $\lambda$ is the optical carrier wavelength, D is the chromatic dispersion coefficient in ps/(nm·km), L is the fibre length, and c is the speed of light in vacuum.

The photocurrent presents a notch at the tone frequency:

$$f_{notch} = \sqrt{\frac{c}{2\lambda^2 DL}} \qquad \text{Equation 1}$$

$f_{notch}$ is the frequency at which, in theory, no power is detected at the tone frequency regardless of its transmitted power.

In practice, due to the noise floor of the transmission system, a small power will still be detected at the notch frequency. A reasonable accuracy in determining the notch frequency can be achieved by setting a photocurrent threshold slightly higher than the noise floor. For example, the threshold may be 50-60 dB lower than the photocurrent detected at the tone frequency in a system where the optical fibre is replaced by an attenuator having an equivalent attenuation to the fibre.

If the noise floor is significant, a higher threshold can be used, continuing to move the detected tone frequency beyond the notch frequency. The notch frequency can be estimated as the average of two tone frequencies, one lower than the notch frequency, the other higher, for which the fibre response equals the photocurrent threshold.

Figure 4:
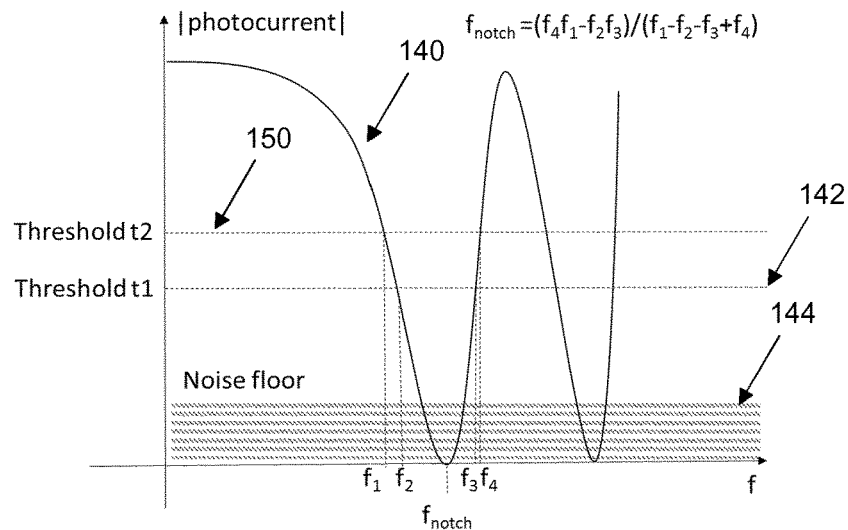

Referring to FIG. 4, the receivers 114, 124 are configured to calculate the respective notch frequency, $f_{notch}$, by linear interpolation of four pilot tone frequencies; two pilot tone frequencies, $f_2$ and $f_3$, at which respective detected photocurrents equal a first photocurrent threshold 140; and two pilot tone frequencies, $f_1$ and $f_4$, at which respective detected photocurrents equal a second, higher, photocurrent threshold 152. Two of the pilot tone frequencies, $f_3$ and $f_4$, are above the notch frequency and two of the pilot tone frequencies, $f_1$ and $f_2$, are below the notch frequency.

Using two thresholds, enables the accuracy of determining the notch frequency to be improved by considering that the slope of the photocurrent is slightly different below and above the notch frequency. The notch frequency may be calculated as:

$$f_{notch} = \frac{f_4 f_1 - f_2 f_3}{f_1 - f_2 - f_3 + f_4}$$

In an embodiment, the receivers 114, 124 are direct detection receivers, such as small form-factor pluggable, SFP, transceivers.

In an embodiment, the processing circuitry 130, 230 is configured to estimate the propagation delay difference depending inversely on a difference of the upstream and downstream notch frequencies.

In an embodiment, the upstream optical carrier has an upstream wavelength, $\lambda_{US}$, and the downstream optical carrier has a downstream wavelength, $\lambda_{DS}$. The processing circuitry 130, 230, 330 is configured to estimate the propagation delay difference, $\Delta T$, as:

$$\Delta T = \frac{c}{4}\left(\frac{1}{\lambda_{DS} f_{notch-DS}^2} - \frac{1}{\lambda_{US} f_{notch-US}^2}\right)$$

It can be demonstrated, as below, that propagation delay, T, depends on the product $\lambda DL$ as:

$$T = AL + \frac{\lambda DL}{2} \qquad \text{Equation 2}$$

where A is an unknown constant.

According to ITU-T G.652 Recommendation, for a standard single mode optical fibre, the fibre chromatic coefficient depends on wavelength as:

$$D(\lambda) = \frac{\lambda S_0}{4}\left[1 - \left(\frac{\lambda_0}{\lambda}\right)^4\right] \qquad \text{Equation A1}$$

where D is the chromatic dispersion coefficient in ps/nm/km, $\lambda$ is the wavelength in nm, $\lambda_0$ is the zero dispersion wavelength (1300 nm for a standard single mode fibre), and $S_0$ is the slope at $\lambda_0$ (0.092 ps/nm²×km for a standard single mode fibre).

A delay coefficient in ps/km can be calculated by integrating equation A1 with respect to wavelength $$\frac{T(\lambda)}{L} = A + \frac{\lambda^2 S_0}{8}\left[1 - \left(\frac{\lambda_0}{\lambda}\right)^4\right] \qquad \text{Equation A2}$$

where L is the fibre length in km.

From Equation 1 and Equation 2, we obtain:

$$T = AL + \frac{c}{4\lambda f_{notch}^2} \qquad \text{Equation 3}$$

The difference between downstream and upstream delay, in a bidirectional system, where downstream and upstream fibre lengths are equal, can be calculated as:

$$\Delta T = \frac{c}{4}\left(\frac{1}{\lambda_{DS} f_{notch-DS}^2} - \frac{1}{\lambda_{US} f_{notch-US}^2}\right) \qquad \text{Equation 4}$$

An optical link 300 according to a further embodiment of the invention is illustrated in FIG. 3. In this embodiment, the optical fibre link comprises a first optical fibre 302 for downstream transmission and a second optical fibre 304 for upstream transmission. Each optical fibre 302, 304 is configured for uni-directional propagation.

The processing circuitry 300 is additionally configured to estimate a respective length each of the optical fibres 302, 304, depending on respective dispersion coefficients of the optical fibres at preselected respective wavelengths and respective notch frequencies of respective pilot tones transmitted on respective optical carriers at the respective wavelengths.

Unidirectional fibre systems use two fibres for downstream and upstream transmission so the same fibre length cannot be assumed for the two directions. Since the fibres are different, the chromatic dispersion coefficients also cannot be assumed to be equal. The fibre length needs to be estimated in order to use Equation 3. This can be done assuming that: the constant A (the inverse of fibre group velocity or, equivalently, the ratio between the light speed in vacuum and the effective refractive index) is known, e.g. from the fibre data sheet; and the chromatic dispersion coefficient at one wavelength, $\lambda_1$, is known (e.g. from the fibre data sheet).

Measuring the notch frequency at $\lambda_1$ the fibre length L can be estimated using Equation 1:

$$L = \frac{c}{2\lambda^2 D(\lambda_1) f_{notch}^2(\lambda_1)}$$

Using Equation 2 again, we obtain the chromatic dispersion coefficient at any wavelength:

$$D(\lambda) = \frac{\lambda_1^2 f_{notch}^2(\lambda_1)}{\lambda^2 f_{notch}^2(\lambda)} D(\lambda_1) \quad \text{Equation 5}$$

In an embodiment, the upstream and downstream transmitters 112, 122 are configured to tune a frequency of the pilot tone within the preselected frequency range, starting at an initial frequency which is not equal to a transfer function notch frequency of the optical fibre link 102, 302, 304.

Figure 5:
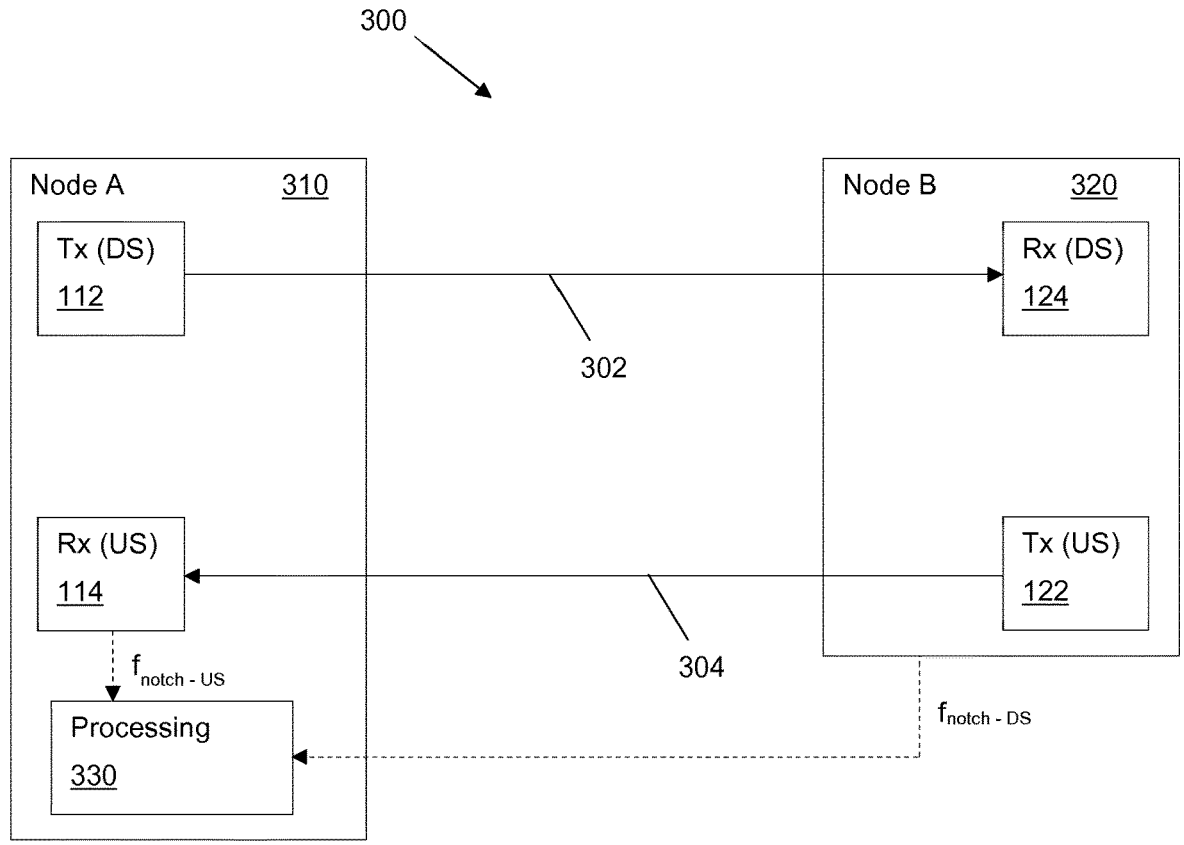

In an embodiment, referring to FIGS. 1, 2 and 5, the receivers 114, 124 are configured to send an acknowledgement message to the respective transmitter 122, 112 to indicate receipt of the pilot tone at a currently set frequency. The transmitters are configured to vary the frequency of the pilot tone by a predetermined amount in response to receiving a said upstream acknowledgement message. The transmitters may therefore be instructed to stop transmission of the pilot tone once the notch frequency has been determined.

A pilot tone is sent downstream, together with the signal data, into an optical fibre link 102, 302. When the receiver 124 detects the tone, it acknowledges the transmitter by means of an upstream message.

The pilot tone frequency is gradually tuned until the receiver communicates through the upstream message that it is longer able to detect the tone.

When this happens, it means that the pilot tone frequency equals the frequency of the notch of the fibre response, which depends on fibre chromatic dispersion and length; that is, ultimately, on the propagation delay in the downstream direction.

Performing the same procedure in the upstream direction, the upstream propagation delay is estimated so that the delay asymmetry can be calculated by difference.

The optical link offers various advantages, as follows. It is applicable to cost effective direct detection systems, and does not require coherent transmission. It requires a limited number of additional blocks, all of which are easy to integrate in a cost effective and small form factor transceiver, e.g. in a SFP transceiver. It enables accuracy of propagation delay difference in the ns range to be determined, which covers all currently relevant applications, such as those in the NG-PON2 and G.metro standards. It allows calculation of propagation delay asymmetry also when traffic data are transmitted; that is to say, in service operation is possible.

In an embodiment, the transmitters 112, 122 are configured to tune the frequency of the pilot tone in steps of a predetermined step size starting at an initial frequency. The receivers 114, 124 are configured to send a reporting message to the respective transmitter when an expected pilot tone is not received. The notch frequency may therefore be determined without requiring signalling between the receiver and the respective transmitter.

In an embodiment, the receivers 114, 124 are configured to extract the respective pilot tone from the respective traffic signal. The receivers may comprise a narrowband phase locked loop to extract a sinusoidal pilot tone from traffic signal. Alternatively, the pilot tone may comprise a codeword that the receivers are configured to extract from the traffic signal.

In an embodiment, the pilot tones are transmitted in an available field of the respective traffic signal's data frame, such as a reference frame or an optical transport network, OTN, frame.

In an embodiment, the transmitters 112, 122 are configured to generate and transmit the pilot tones as an overmodulated channel.

In an embodiment, the transmitters 112, 122 each comprise an oscillator configured to generate the respective pilot tone with a stability of a few parts per million, ppm. A stability of a few ppm is sufficient to estimate the propagation delay difference to an accuracy in the order of nanoseconds, ns, which meets currently envisaged fronthaul network applications in the NG-PON2 and G.metro standards. Low cost, free to run oscillators may therefore be used.

Figure 6:
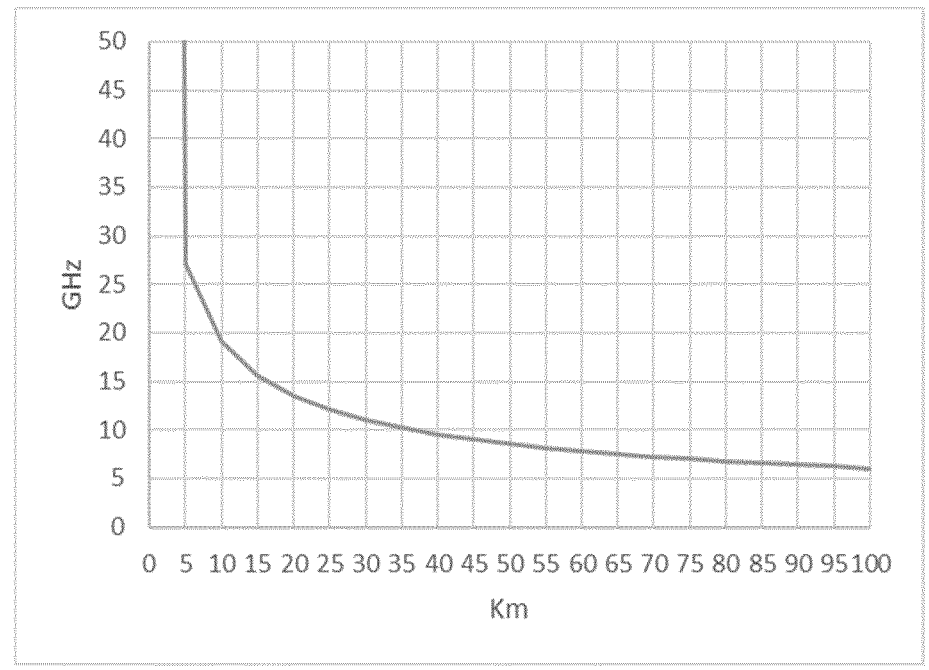
FIG. 6 illustrates notch frequency as a function of fibre length of the optical link.

To demonstrate that the notch frequency can be determined using low cost oscillators that can be integrated in a small form factor module, for example a SFP, notch frequency, GHz, as a function of fibre length, Km, at a wavelength of 1550 nm and fibre dispersion coefficient of 17 ps/nm/km was plotted, as shown in FIG. 6.

It can be seen in FIG. 6 that for any practical distance between 5 km and 100 km, the notch frequency is in the order of 10 GHz, which is feasible with off the shelf oscillators. The frequency steeply increases for very fibre lengths but in this range fibre delay is less critical.

Figure 7:
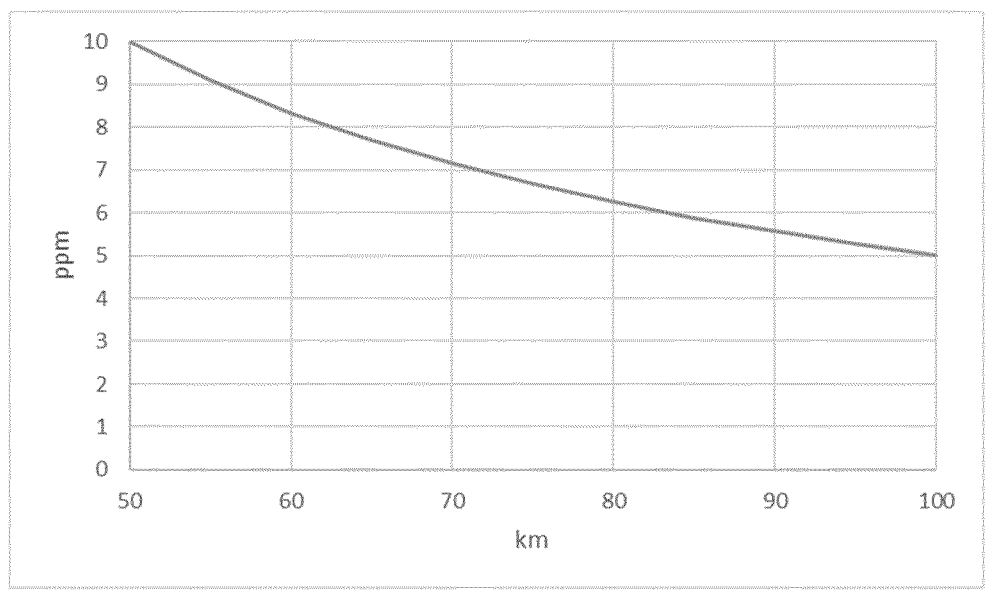
FIG. 7 illustrates required accuracy of the pilot tone frequency.

For long fibre lengths, the curve becomes flat, indicating that big variations in length (and delay) correspond to small variations in the notch frequency. This may give rise to potential accuracy issues if the oscillator is not stable enough. To verify the absence of accuracy issues, the notch frequency accuracy, in ppm, required to achieve 1 m of length resolution, was plotted as a function of fibre length, in Km, as shown in FIG. 7.

The notch frequency accuracy is calculated as:

$$\text{Frequency accuracy} = \frac{f_{notch}(L) - f_{notch}(L + 1m)}{f_{notch}(L)} \quad \text{Equation 6}$$

With a typical effective refractive index value of 1.5, 1 m of optical fibre corresponds to 5 ns of delay. FIG. 7 shows that cheap, free run oscillators with a stability of a few ppm are sufficient to meet the accuracy requirements of a fronthaul system.

In an embodiment, the transmitters 112, 122 are configured to generate and transmit pilot tones in a frequency range in which a spectrum of the respective traffic signal is negligible.

It is desirable, even if not necessary, that the pilot tone frequency is within a frequency range where the traffic signal spectrum is negligible. Considering a fibre length of up to 30 km, which is the case for time-sensitive fronthaul, and looking at the vertical axis of FIG. 6, this is the case for data rates up to 10 Gbit/s, which typically have significant spectral content below 7 GHz. For 25 Gbit/s data rates, the pilot tone needs to be extracted from the data signal. This can be done by sending a codeword instead of a pure tone or, the tunable pilot tone can be synthetized and discriminated by means of a phase-locked loop, PLL, that can be easily integrated in a small form factor transceiver (e.g. a SFP) with acceptable additional cost.

For an optical carrier generated using a direct modulation laser, the pilot tone is generated by modulating the laser bias current. Where the optical carrier is externally modulated, the pilot tone may be summed to the voltage or current carrying the traffic data and then applied to the electrical input of the modulator.

Corresponding embodiments apply to the method of estimating a propagation delay difference of an optical link, the node for a communication network and the control system described below.

Figure 8:
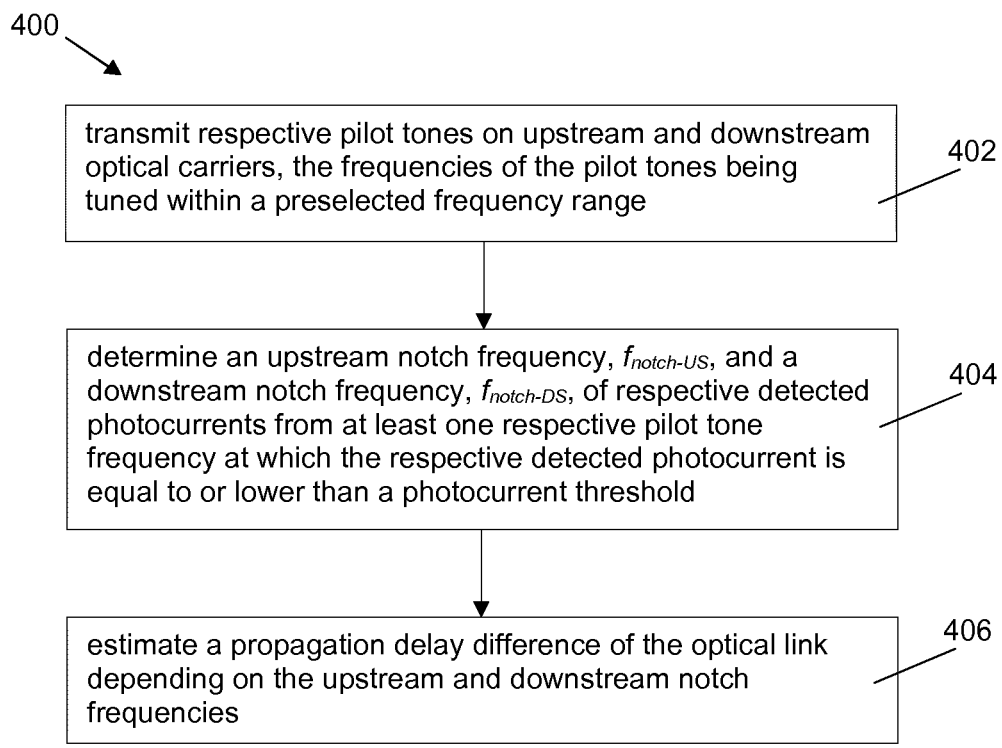
FIGS. 8 to 12 illustrate steps of methods of estimating a propagation delay difference of an optical link of a communication network according to embodiments of the invention.

Referring to FIG. 8, an embodiment of the invention provides method 400 of estimating a propagation delay difference of an optical link of a communication network.

The method comprises steps of:

transmitting 402 respective pilot tones on upstream and downstream optical carriers, the frequencies of the pilot tones being tuned within a preselected frequency range;

determining 404 an upstream notch frequency, $f_{notch-US}$, and a downstream notch frequency, $f_{notch-DS}$, of respective detected photocurrents from at least one respective pilot tone frequency at which the respective detected photocurrent is equal to or lower than a photocurrent threshold; and estimating 406 a propagation delay difference of the optical link depending on the upstream and downstream notch frequencies.

Figure 9:
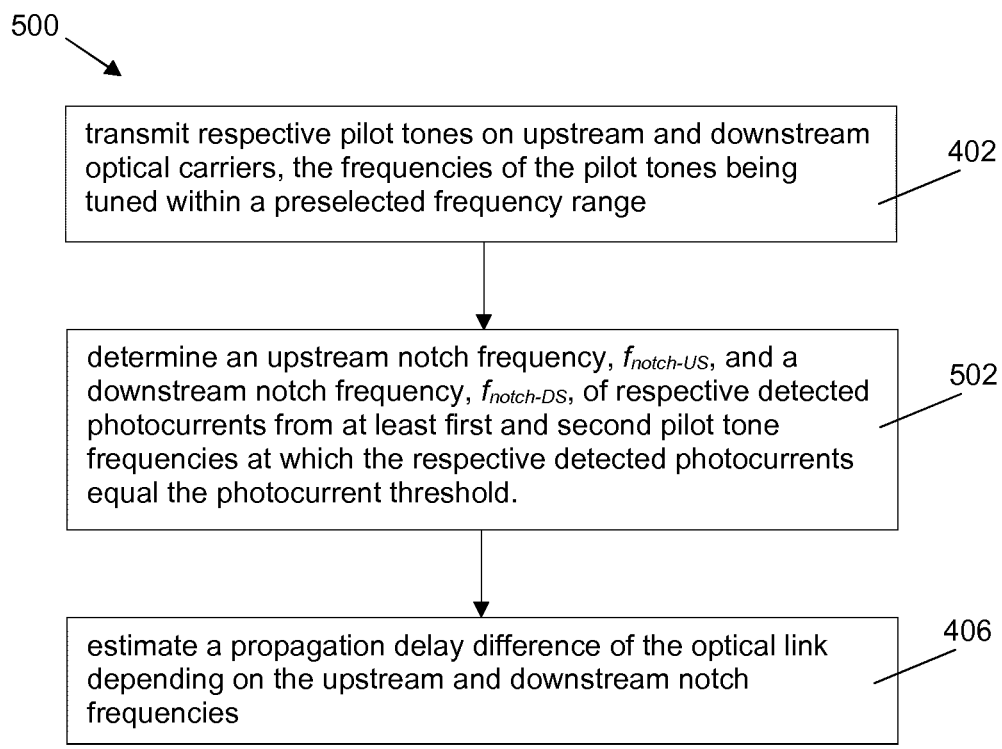

Referring to the embodiment illustrated in FIG. 9, the respective notch frequency is determined 502 from at least first and second pilot tone frequencies at which the respective detected photocurrents equal the photocurrent threshold.

As described above with reference to FIG. 3, the notch frequency is calculated as an average of a first pilot tone frequency, $f_1$, and a second pilot tone frequency, $f_2$, at which respective detected photocurrents 140 equal the photocurrent threshold, 142. The first pilot tone frequency is below the notch frequency, $f_{notch}$, and the second pilot tone above the notch frequency.

As described above, if the noise floor is significant, a higher threshold can be used, continuing to move the detected tone frequency beyond the notch frequency.

As described above with reference to FIG. 4, the notch frequency, $f_{notch}$, may alternatively be calculated by linear interpolation of four pilot tone frequencies; two pilot tone frequencies, $f_2$ and $f_3$, at which respective detected photocurrents equal a first photocurrent threshold 140; and two pilot tone frequencies, $f_1$ and $f_4$, at which respective detected photocurrents equal a second, higher, photocurrent threshold 152. Two of the pilot tone frequencies, $f_3$ and $f_4$, are above the notch frequency and two of the pilot tone frequencies, $f_1$ and $f_2$, are below the notch frequency. The notch frequency may be calculated as:

$$f_{notch} = \frac{f_4 f_1 - f_2 f_3}{f_1 - f_2 - f_3 + f_4}$$

The pilot tone frequency is tuned with a step size small enough to allow detection of the decreasing slope of the first lobe of the fibre link frequency response, as illustrated in FIG. 4.

In an embodiment, the estimate of the propagation delay difference depends inversely on a difference of the upstream and downstream notch frequencies.

Figure 10:
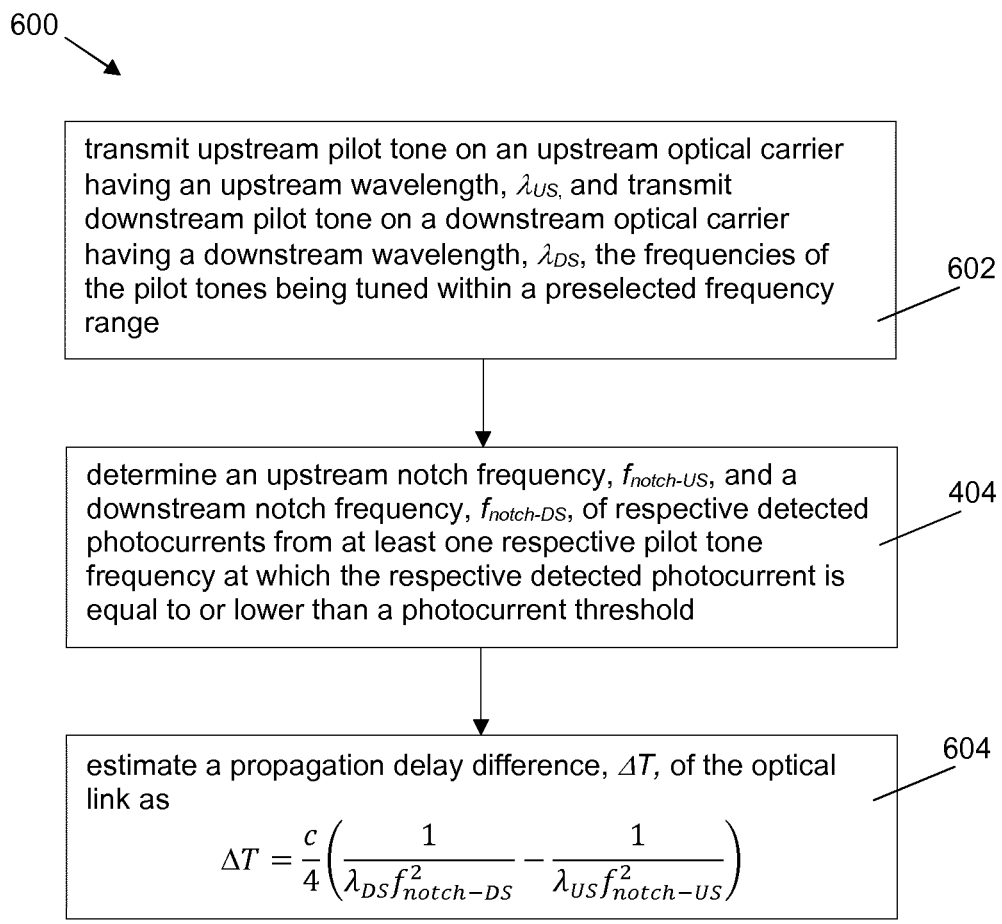

Referring to FIG. 10, in an embodiment the upstream pilot tone is transmitted 602 on an upstream optical carrier having an upstream wavelength, $\lambda_{US}$, and the downstream pilot tone is transmitted 602 on a downstream optical carrier having a downstream wavelength, $\lambda_{DS}$. The propagation delay difference, $\Delta T$, is estimated 604 as:

$$\Delta T = \frac{c}{4}\left(\frac{1}{\lambda_{DS} f_{notch-DS}^2} - \frac{1}{\lambda_{US} f_{notch-US}^2}\right).$$

Figure 11:
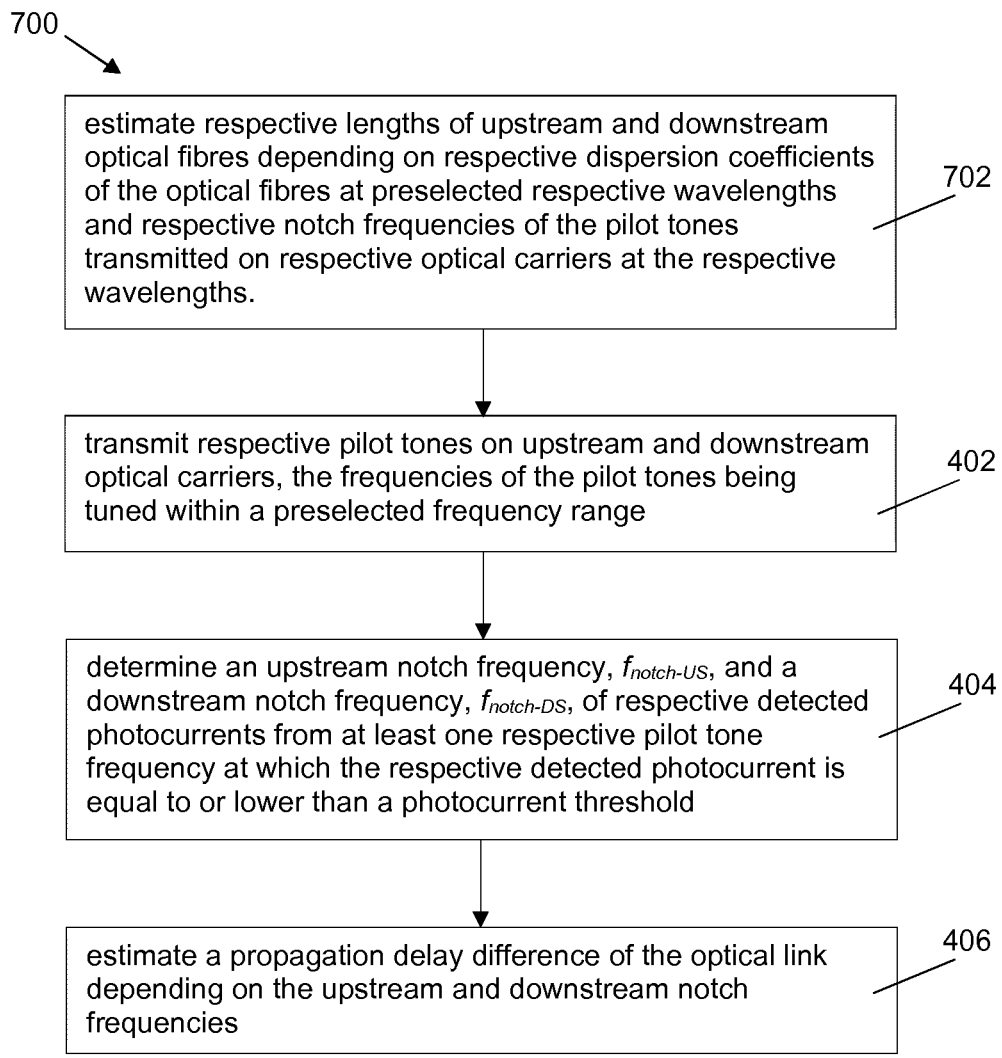

In an embodiment the optical link comprises a first optical fibre for downstream transmission and a second optical fibre for upstream transmission, as illustrated in FIG. 5. As illustrated in FIG. 11, the method additionally comprises estimating 702 respective lengths of the optical fibres 302, 304 depending on respective dispersion coefficients of the optical fibres at preselected respective wavelengths and respective notch frequencies of the pilot tones transmitted on respective optical carriers at the respective wavelengths.

In an embodiment, the frequency of the pilot tone is tuned within the preselected frequency range, starting at an initial frequency which is not equal to a transfer function notch frequency of the optical fibre link 102, 302, 304.

Figure 12:
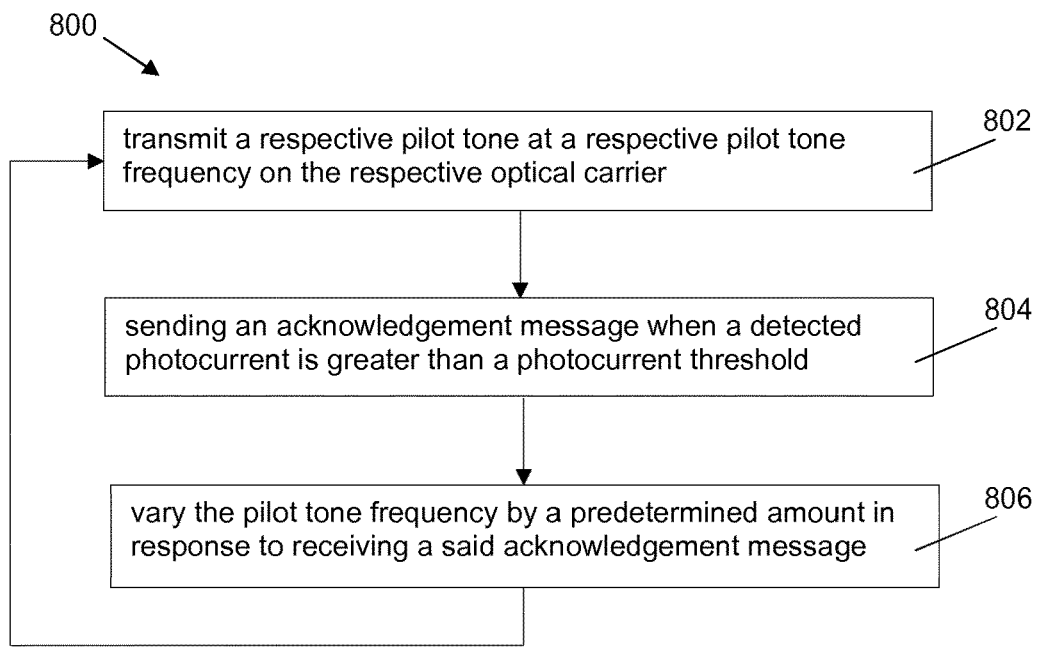

Referring to FIG. 12, in an embodiment a pilot tone is sent 802 downstream, together with the signal data, into an optical fibre link. An upstream acknowledgement message is sent 804 when a detected photocurrent is greater than the photocurrent threshold.

The pilot tone frequency is gradually tuned 806 until the receiver communicates through the upstream message that it is longer able to detect the tone.

When this happens, it means that the pilot tone frequency equals the frequency of the notch of the fibre response, which depends on fibre chromatic dispersion and length; that is, ultimately, on the propagation delay in the downstream direction.

Performing the same procedure in the upstream direction, the upstream propagation delay is estimated so that the delay asymmetry can be calculated by difference.

A fronthaul system can tolerate differences of propagation delay in the two propagation directions in the order of 10 ns. As discussed above, such small values of resolution can be estimated by transmitting a tunable pilot tone, and varying its frequency until detecting a notch. This requires a bidirectional channel where:

1) The pilot tone frequency is communicated downstream from the transmitter to receiver. To this purpose, an available field in the data frame can be used, as well as a message channel, e.g. generated by superimposing a small modulation to the data modulation, as in the system which is being standardized in the new G. Metro Recommendation.

2) The pilot tone is transmitted at an arbitrary initial frequency. It is a good choice to select a frequency high enough to be sure that it does not equal the notch corresponding to length and chromatic dispersion of the optical fibre link.
3) When the tone is detected, the receiver acknowledges the transmitter via an upstream message. Either a data field or a dedicated channel can be used.
4) The transmitter sets a higher frequency the pilot tone. The incremental step is a design choice depending on the desired frequency accuracy. According to the curve of FIG. 6., the shorter the fibre, the higher the step. In any case, the step should be small enough to allow to detect the decreasing slope of the first lobe of the frequency response in FIG. 4. and FIG. 5.
5) Steps 3 and 4 are repeated until the receiver detects a notch. This condition is assumed to be met when the tone amplitude is below a given threshold. Alternatively, the notch frequency can be estimated by averaging frequencies at which the tone amplitude has equal values below and above the notch frequency (see FIG. 3 and FIG 4.
6) The receiver tells the transmitter to stop sending the pilot tone since the notch frequency has been reached.

Then, steps 1 to 5 are repeated in the upstream direction, by an upstream transmitter and receiver.

Finally, the upstream and downstream notch frequencies are used to estimate the propagation delay difference between the two directions using Equation 5.

Figure 13:
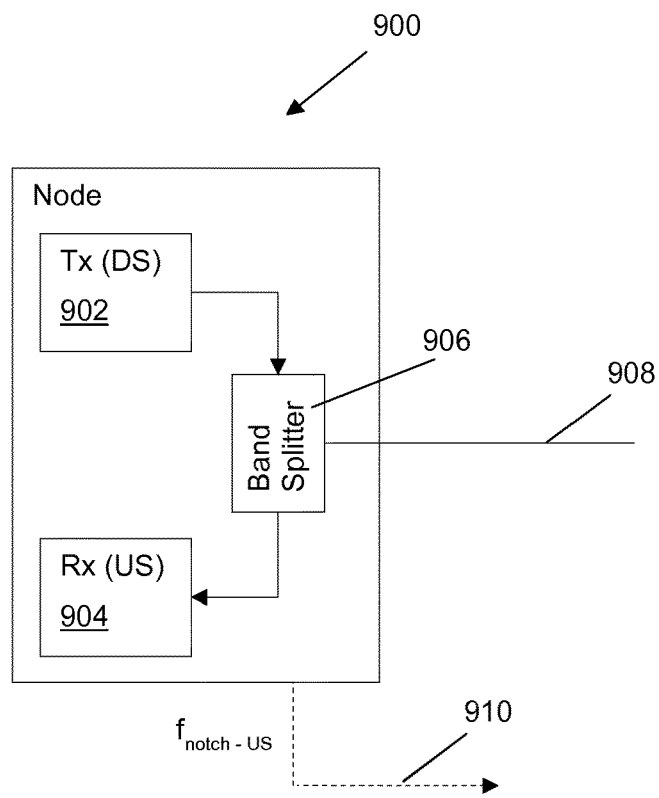
FIGS. 13 and 14 illustrate nodes for a communication network according to embodiments of the invention.

FIG. 13 illustrates a node 900 for a communication network, according to an embodiment of the invention. The node 900 comprises a transmitter 902 and a receiver 904. A bandsplitter 906 is provided for routing upstream and downstream optical signals to and from an optical fibre link 908, configured for bidirectional propagation.

The transmitter 902 configured to transmit a downstream pilot tone on a downstream optical carrier and is configured to tune a frequency of the downstream pilot tone within a preselected frequency range. The receiver 904 is configured to receive an upstream pilot tone on an upstream optical carrier from a second node; a frequency of the received upstream pilot tone varies within a preselected frequency range. The receiver is configured to determine an upstream notch frequency, $f_{notch-US}$, from at least one upstream pilot tone frequency at which a respective detected photocurrent is equal to or lower than a photocurrent threshold.

The node 900 is configured to generate an output signal 910 comprising an indication of the upstream notch frequency to processing circuitry configured to estimate a propagation delay difference of an optical link comprising the node 900 and the second node.

The processing circuitry in this embodiment is remotely located, in for example a network management system or network control system.

A further embodiment of the invention provides a control system comprising processing circuitry. The processing circuitry is configured to receive an upstream notch frequency and a downstream notch frequency of an optical link, and is the processing circuitry is configured to estimate a propagation delay difference of the optical link depending on the upstream and downstream notch frequencies.

Figure 14:
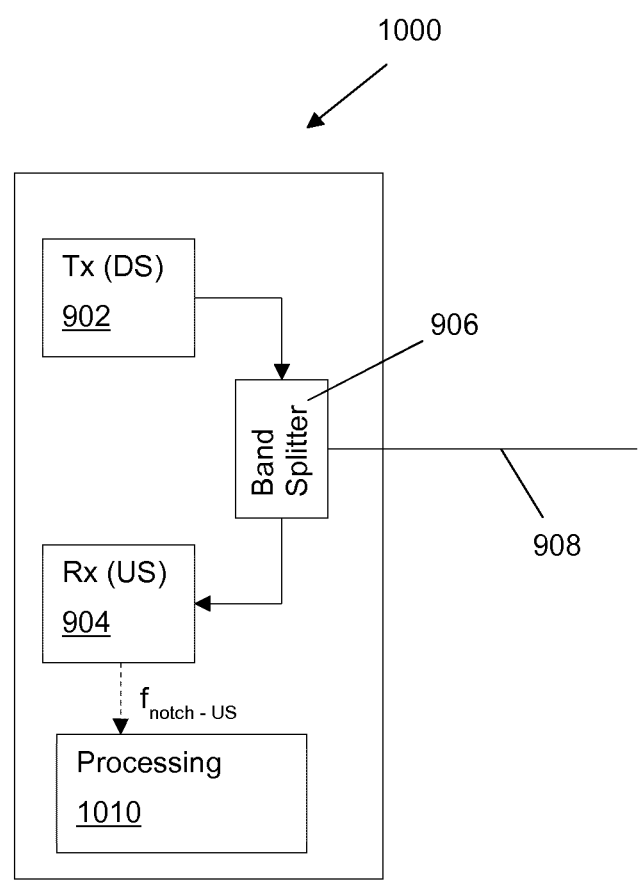

FIG. 14 illustrates a node 1000 for a communication network, according to another embodiment of the invention. In this embodiment, the node additionally comprises processing circuitry 1010 configured to determine an upstream notch frequency, $f_{notch-US}$, from at least one upstream pilot tone frequency at which a respective detected photocurrent is equal to or lower than a photocurrent threshold. The receiver 904 is configured to provide an indication of the upstream notch frequency to the processing circuitry.

Figure 15:
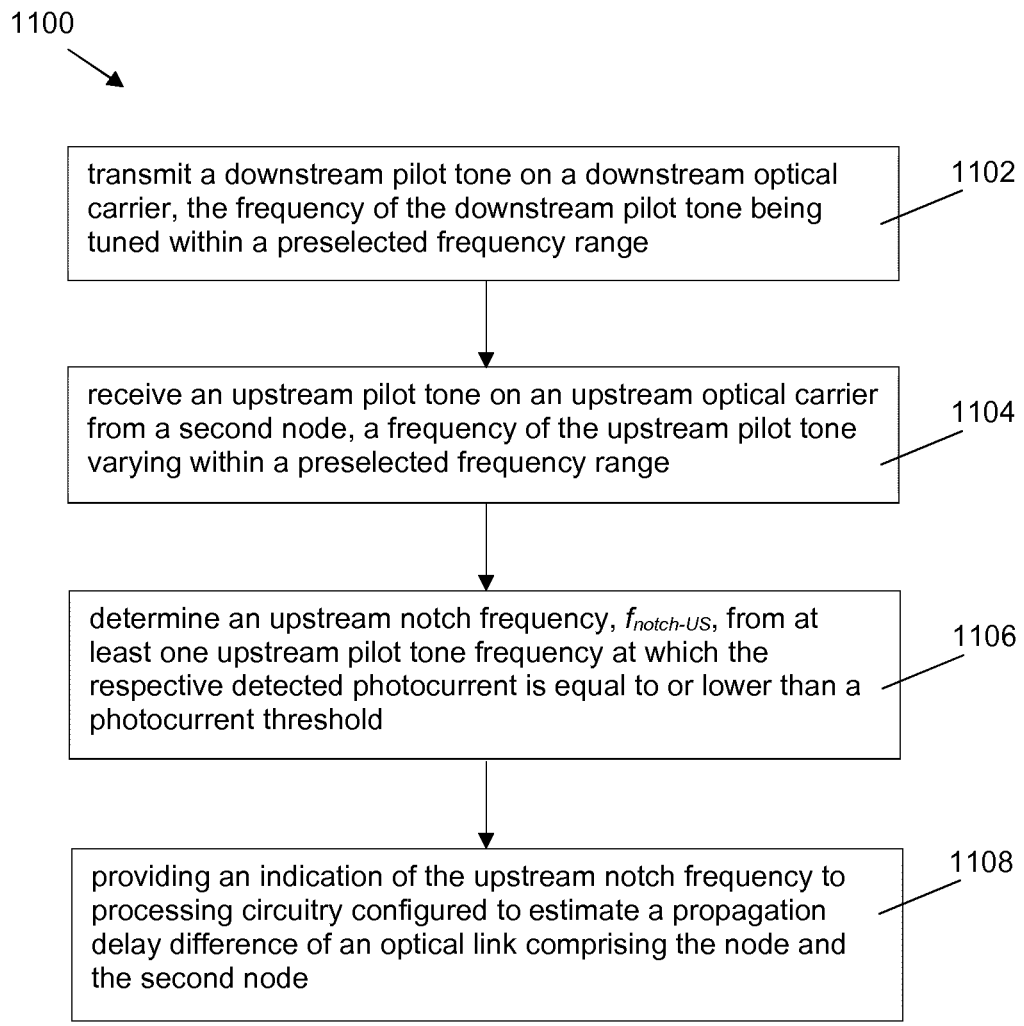
FIG. 15 illustrates steps of a method at a node for a communication network according to an embodiment of the invention.

FIG. 15 illustrates steps of a method 1100 at a node for a communication network according to an embodiment of the invention. The method comprises steps of:
 a. transmitting 1002 a downstream pilot tone on a downstream optical carrier, the frequency of the downstream pilot tone being tuned within a preselected frequency range;
 b. receiving 1004 an upstream pilot tone on an upstream optical carrier from a second node, a frequency of the upstream pilot tone varying within a preselected frequency range;
 c. determining 1006 an upstream notch frequency from at least one upstream pilot tone frequency at which a respective detected photocurrent is equal to or lower than a photocurrent threshold; and
 d. providing 1008 an indication of the upstream notch frequency to processing circuitry configured to estimate a propagation delay difference of an optical link comprising the node and the second node.

In an embodiment, the method comprises generating an output signal comprising an indication of the upstream notch frequency and sending the output signal to remotely located processing circuitry.

An embodiment of the invention provides a computer program, comprising instructions which, when executed on at least one processor, cause the at least one processor to carry out any of the steps of the methods of the above embodiments.

An embodiment of the invention provides a carrier containing a computer program, comprising instructions which, when executed on at least one processor, cause the at least one processor to carry out any of the steps of the methods of the above embodiments.

The carrier is one of an electronic signal, optical signal, radio signal, or computer readable storage medium.

The invention claimed is:

1. An optical link for a communication network, the optical link comprising:
 an optical fibre link;
 a downstream transmitter, a downstream receiver, an upstream transmitter and an upstream receiver, the upstream and downstream transmitters being configured to transmit a respective pilot tone on a respective optical carrier and are configured to tune a frequency of the pilot tone within a preselected frequency range, and the upstream and downstream receivers being configured respectively to determine an upstream notch frequency, $f_{notch-US}$, and a downstream notch frequency, $f_{notch-DS}$, of respective detected photocurrents from at least one respective pilot tone frequency at which the respective detected photocurrent is equal to or less than a photocurrent threshold; and
 processing circuitry configured to receive the upstream and downstream notch frequencies and configured to estimate a propagation delay difference of the optical link depending on the upstream and downstream notch frequencies.

2. The optical link according to claim 1, wherein the upstream and downstream receivers are configured to determine the respective notch frequency from at least first and second pilot tone frequencies at which the respective detected photocurrents equal the photocurrent threshold.

3. The optical link according to claim 2, wherein the upstream and downstream receivers are configured to calculate the respective notch frequency as an average of first and second pilot tone frequencies at which the respective detected photocurrents equal the photocurrent threshold.

4. The optical link according to claim 2, wherein the upstream and downstream receivers are configured to calculate the respective notch frequency by linear interpolation of four pilot tone frequencies, two pilot tone frequencies at which the respective detected photocurrents equal the photocurrent threshold and two further pilot tone frequencies at which the respective detected photocurrents equal a second, different, photocurrent threshold.

5. The optical link according to claim 1, wherein the processing circuitry is configured to estimate the propagation delay difference depending inversely on a difference of the upstream and downstream notch frequencies.

6. The optical link according to claim 5, wherein the respective optical carriers respectively have an upstream wavelength, $\lambda_{US}$, and a downstream wavelength, $\lambda_{DS}$, and wherein the processing circuitry is configured to estimate the propagation delay difference, $\Delta T$, as $$\Delta T = \frac{c}{4}\left(\frac{1}{\lambda_{DS} f_{notch-DS}^2} - \frac{1}{\lambda_{US} f_{notch-US}^2}\right).$$

7. The optical link according to claim 1, wherein the optical fibre link further comprises a first optical fibre for downstream transmission and a second optical fibre for upstream transmission, and wherein the processing circuitry is additionally configured to estimate respective lengths of the optical fibres depending on respective dispersion coefficients of the optical fibres at preselected respective wavelengths and respective notch frequencies of respective pilot tones transmitted on respective optical carriers at the respective wavelengths.

8. A method of estimating a propagation delay difference of an optical link of a communication network, the method comprising steps of:
    a. transmitting respective pilot tones on upstream and downstream optical carriers, frequencies of the respective pilot tones being tuned within a preselected frequency range;
    b. determining an upstream notch frequency, $f_{notch-US}$, and a downstream notch frequency, $f_{notch-DS}$, of respective detected photocurrents from at least one respective pilot tone frequency at which the respective detected photocurrent is equal to or less than a photocurrent threshold; and
    c. estimating a propagation delay difference of the optical link depending on the upstream and downstream notch frequencies.

9. The method according to claim 8, wherein the respective notch frequency is determined from at least first and second pilot tone frequencies at which the respective detected photocurrents equal the photocurrent threshold.

10. The method according to claim 9, wherein the respective notch frequency is calculated as an average of first and second pilot tone frequencies at which the respective detected photocurrents equal the photocurrent threshold.

11. The method according to claim 9, wherein the respective notch frequency is calculated by linear interpolation of four pilot tone frequencies, two pilot tone frequencies at which the respective detected photocurrents equal the photocurrent threshold and two further pilot tone frequencies at which the respective detected photocurrents equal a second, different, photocurrent threshold.

12. The method according to claim 8, wherein the estimate of the propagation delay difference depends inversely on a difference of the upstream and downstream notch frequencies.

13. The method according to claim 8, wherein the upstream and downstream optical carriers respectively have an upstream wavelength, $\lambda_{US}$, and a downstream wavelength, $\lambda_{DS}$, and wherein the propagation delay difference, $\Delta T$, is estimated as $$\Delta T = \frac{c}{4}\left(\frac{1}{\lambda_{DS} f_{notch-DS}^2} - \frac{1}{\lambda_{US} f_{notch-US}^2}\right).$$

14. The method according to claim 8, wherein the optical link comprises a first optical fibre for downstream transmission and a second optical fibre for upstream transmission, and wherein the method additionally comprises estimating respective lengths of the optical fibres depending on respective dispersion coefficients of the optical fibres at preselected respective wavelengths and respective notch frequencies of respective pilot tones transmitted on respective optical carriers at the respective wavelengths.

15. A node for a communication network, the node comprising:
    a transmitter configured to transmit a downstream pilot tone on a downstream optical carrier and configured to tune a frequency of the downstream pilot tone within a preselected frequency range; and
    a receiver configured to receive an upstream pilot tone on an upstream optical carrier from a second node, a frequency of the upstream pilot tone varying within a preselected frequency range, and configured to determine an upstream notch frequency from at least one upstream pilot tone frequency at which a respective detected photocurrent is equal to or less than a photocurrent threshold; and
    the node being configured to provide an indication of the upstream notch frequency to processing circuitry configured to estimate a propagation delay difference of an optical link comprising the node and the second node.

16. A method at a node for a communication network, the method comprising:
    a. transmitting a downstream pilot tone on a downstream optical carrier, a frequency of the downstream pilot tone being tuned within a preselected frequency range;
    b. receiving an upstream pilot tone on an upstream optical carrier from a second node, a frequency of the upstream pilot tone varying within a preselected frequency range;
    c. determining an upstream notch frequency from at least one upstream pilot tone frequency at which a respective detected photocurrent is equal to or less than a photocurrent threshold; and
    d. providing an indication of the upstream notch frequency to processing circuitry configured to estimate a propagation delay difference of an optical link comprising the node and the second node.

17. A control system comprising processing circuitry configured to:
    receive an upstream notch frequency and a downstream notch frequency of an optical link, the upstream notch frequency and the downstream notch frequency corresponding to respective detected photocurrents and being determined from at least one respective tone frequency at which the respective detected photocurrent is equal to or less than a photocurrent threshold; and estimate a propagation delay difference of the optical link depending inversely on a difference of the upstream and downstream notch frequencies.

18. The optical link according to claim 2, wherein the processing circuitry is configured to estimate the propagation delay difference depending inversely on a difference of the upstream and downstream notch frequencies.

19. The optical link according to claim 2, wherein the optical fibre link further comprises a first optical fibre for downstream transmission and a second optical fibre for upstream transmission, and wherein the processing circuitry is additionally configured to estimate respective lengths of the optical fibres depending on respective dispersion coefficients of the optical fibres at preselected respective wavelengths and respective notch frequencies of respective pilot tones transmitted on respective optical carriers at the respective wavelengths.

20. The method according to claim 9, wherein the estimate of the propagation delay difference depends inversely on a difference of the upstream and downstream notch frequencies.

* * * * *